United States Patent [19]
Kansa et al.

[11] Patent Number: 5,593,248
[45] Date of Patent: Jan. 14, 1997

[54] NONTOXIC CHEMICAL PROCESS FOR IN SITU PERMEABILITY ENHANCEMENT AND ACCELERATED DECONTAMINATION OF FINE-GRAIN SUBSURFACE SEDIMENTS

[75] Inventors: Edward J. Kansa, Livermore; Ananda M. Wijesinghe, Tracy; Brian E. Viani, Oakland, all of Calif.

[73] Assignee: The Regents of the University of California, Oakland, Calif.

[21] Appl. No.: 495,294

[22] Filed: Jun. 27, 1995

[51] Int. Cl.⁶ .............................. B09C 1/08; E02D 3/10; E21B 43/40
[52] U.S. Cl. ..................... 405/128; 166/266; 166/271; 405/263; 405/264; 405/268
[58] Field of Search ................... 405/128, 258, 405/263, 264, 266, 267, 268, 270; 210/747; 166/266, 267, 271

[56] References Cited

U.S. PATENT DOCUMENTS

| | | | |
|---|---|---|---|
| Re. 33,102 | 10/1989 | Visser et al. | 166/267 |
| 4,582,611 | 4/1986 | Wang | 210/747 |
| 5,098,224 | 3/1992 | Netzel et al. | 405/128 |
| 5,230,586 | 7/1993 | Bachhausen et al. | 405/128 |
| 5,449,251 | 9/1995 | Daily et al. | 405/128 |
| 5,476,992 | 12/1995 | Ho et al. | 405/128 X |

Primary Examiner—George A. Suchfield
Attorney, Agent, or Firm—Henry P. Sartorio; John P. Wooldridge

[57] ABSTRACT

The remediation of heterogeneous subsurfaces is extremely time consuming and expensive with current and developing technologies. Although such technologies can adequately remove contaminants in the high hydraulic conductivity, coarse-grained sediments, they cannot access the contaminated low hydraulic conductivity fine-grained sediments. The slow bleed of contaminants from the fine-grained sediments is the primary reason why subsurface remediation is so time-consuming and expensive. This invention addresses the problem of remediating contaminated fine-grained sediments. It is intended that, in the future, a heterogeneous site be treated by a hybrid process that first remediates the high hydraulic conductivity, coarse-grained sediments, to be followed by the process, described in this invention, to treat the contaminated low hydraulic conductivity fine-grained sediments. The invention uses cationic flocculents and organic solvents to collapse the swelling negative double layer surrounding water saturated clay particles, causing a flocculated, cracked clay structure. The modification of the clay fabric in fine-grained sediments dramatically increases the hydraulic conductivity of previously very tight clays many orders of magnitude.

20 Claims, 7 Drawing Sheets

NONTOXIC CHEMICAL PROCESS FOR IN SITU PERMEABILITY ENHANCEMENT AND ACCELERATED DECONTAMINATION OF FINE-GRAIN SUBSURFACE SEDIMENTS

The United States Government has rights in this invention pursuant to Contract No. W-7405-ENG-48 between the United States Department of Energy and the University of California for the operation of Lawrence Livermore National Laboratory.

CROSS REFERENCE TO RELATED APPLICATION

The copending, commonly assigned patent application entitled "Separation Of Toxic Metal Ions, Hydrophilic Hydrocarbons, Hydrophobic Fuel And Halogenated Hydrocarbons And Recovery Of Ethanol From A Process Stream", filed on the same date as the instant application Ser. No. 08/495,293, is fully incorporated herein by reference.

BACKGROUND OF THE INVENTION

1. Field of the Invention

The present invention relates generally to subsurface decontamination or remediation, and more particularly, to the remediation of contaminated fine-grained sediments.

2. Description of Related Art

The National Research Council (NRC) (1994) published a book entitled, "Alternatives to Groundwater Cleanup", (National Research Council, National Academy Press, Washington, DC. (1994)) that summarizes the current state of the art in removing subsurface contaminants. In this book, the NRC arrived at the following conclusions. Current and developing technologies are cost-effective in remediating coarse-grained sediments (CGS) such as sands and gravels, but ineffective in removing contaminants from fine-grained sediments (FGS). The reason for the inability of present and developing technologies to remediate the FGS is primarily the very low hydraulic conductivity of FGS that effectively stops the flow of flushing fluids such as water, air, and steam from penetrating the FGS and flushing contaminants away. In contrast, the CGS possess hydraulic conductivities that are many orders of magnitude greater than FGS; consequently, they are readily flushed. Further, this book concludes that "while current technology can restore portions of the nation's contaminated ground-water sites to meet drinking water standards, total clean up at many sites is not feasible, even though such decontamination is required by federal and state laws."

Most contaminated subsurfaces are heterogeneous composed of bodies of CGS and FGS due to prior geological deposition mechanisms. CGS are contaminated by either capillary inhibition or advective groundwater transport. These mechanisms are effective in only bringing contaminants to the exterior surfaces of the FGS. The primary processes of contaminating the interior of the FGS is molecular diffusion, and sorption is the primary mechanism by which contaminants attach themselves to the hydrophobic organic components of the FGS. In addition, the inorganic clay components of the FGS are intrinsically negatively charged, and attract the positively charged toxic metal ions (TMI) onto the FGS surfaces. Random fluctuations in pH, temperature, redox potential, or other particle collisions in the groundwater can dislodge the TMI, polluting the groundwater.

Since current and developing subsurface technologies rely upon a flushing fluid to remove these hydrophobic contaminants, the advective removal of such contaminants is realized only in the CGS, leaving the contaminated FGS largely unaffected. As a consequence, the contaminants that have either adsorbed onto the organic matter onto the surface of the FGS or that have entered the interior by molecular diffusion, act as sources of contamination that slowly bleed contaminants back into the cleaned CGS. The NRC reported several case studies in heterogeneous sediments that were remediated by current technologies, only to be recontaminated in a few years to comparable or higher levels by the mechanisms of back-diffusion and desorption of contaminants from the fine-grained sediments.

It is the recontamination mechanisms of desorption and back-diffusion that renders subsurface remediation so time-consuming (many decades and centuries) and so expensive (many millions of dollars). The NRC concluded that the remediation of heterogeneous subsurfaces in both the unsaturated (vadose) zone and the saturated (groundwater) zone of contaminants to the stringent drinking water standards is not currently achievable by current and developing remediation technologies.

Existing subsurface remediation process technologies have a number of deficiencies. Typically, fuel hydrocarbons (FH) and halogenated hydrocarbons (HH) enter the subsurface as non-aqueous phase liquids (NAPL). Processes such as gravity flow and capillary forces transport NAPL through the vadose zone to encounter the saturated zone. A fraction of the contaminants will dissolve in the ground water to an extent governed by their intrinsic water solubility. Groundwater advective transport may carry them down-stream of the spill site, and advectively-based hydrodynamic dispersion will dissipate these contaminants over a larger volume in the CGS permeable zones. At a FGS interface, molecular diffusion and adsorption, not advection, are the mechanisms by which pollutants contaminate FGS. Similarly, the pollutants exit FGS by back-diffusion and desorption, not advection. Hence, if the FGS are contaminated, it is the very slow processes of molecular diffusion and desorption that make remediation of contaminated heterogeneous subsurfaces so expensive and time consuming, because the fast mechanism of advection does not play the dominant role of remediating FGS as in the case of the CGS.

The NRC book states "Underground environments vary widely, and many common contaminants have characteristics that make decontamination difficult. Because fluids move through irregular spaces between grains of sand and gravel, or through fractures in solid rock, contaminants often seep away from their sources in unpredictable ways. In some cases, contaminants are trapped in clay or microscopic pores in rocks too small for water to flush them out. These trapped contaminants can become long-term sources of pollution as they slowly diffuse into nearby groundwater."

FIG. 1, taken from FIG. 3—3, page 110, in Alternatives in Ground Water Cleanup, illustrates the time required for trichloroethene (TCE) to diffuse out of clay lenses at various penetration depths. The deeper the contaminants have penetrated, the longer will contaminants continue to diffuse out of clay lenses. In FIG. 1, TCE has penetrated to three example depths: 0.3 m, 0.6 m, and 1.2 m, and will persist in back-diffusing, for 20 years, 66 years, and well over a century, respectively.

The NRC has analyzed standard technologies and concluded that conventional pump-and-treat (P&T) could take a few years to tens, hundreds, or even thousands of years to effect remediation, depending upon the site. The committee concluded that P&T systems are beneficial because they can partially remove underground contaminants, keep them from migrating away from their sources, and contain and limit the size of the contaminated region. However, P&T technology is ineffective for cleaning up locations with significant amounts of solvents, precipitated metals, contaminants that have diffused into small pore spaces of the FGS or that adhere strongly to soils or other sediments. The committee found that increasing the pumping rate to remove mass from source areas is not efficient.

While enhanced P&T systems such as air sparging and in-situ bio-remediation can increase significantly the removal of contaminants and reduce treatment costs, such systems have the same limitations as conventional P&T in FGS and will not be able to fully restore sites with severe contamination.

The book points out that the site hydrogeology is a very important factor in determining the relative ease in remediating a contaminated aquifer. Homogeneous high permeability regions of sites are the easiest to mobilize and flush contaminants, whereas the tight zones in heterogeneous regions and fractured rock are most difficult. Strongly sorbed contaminants and those that have diffused into the clays are difficult to extract and continue to dissolve and/or diffuse into the groundwater.

The NRC investigated many enhanced pump and treat systems and alternative technologies that have been proven capable of shortening remediation time in permeable regions and reducing cost and concluded that these methods are greatly limited by the presence of low permeability zones and sites of strong sorption. These technologies include soil vapor extraction, in-situ bio-remediation, bio-venting, pulsed pumping, air sparging, steam-enhanced extraction, in-situ thermal desorption, flushing with surfactants or cosolvents, and injection of chemicals to transform contaminants in place. Physical containment of contaminants can prevent contaminant migration, but is not considered a permanent solution.

FIG. 2 illustrates the various mechanisms of clay contamination such as sorption of FH and HH contaminants onto the hydrophobic component of organic material at the surface of the FGS, the molecular diffusion of HH and/or hydrophilic contaminants into clays to the present penetration depth, and toxic metal cations attached to the negatively charged inorganic components of the FGS. The model shows a line 2 separating the uncontaminated FGS region 4 from the contaminated FGS region 6, which is separated from the CGS region 8 by line 10. When the permeable zones are cleaned, mechanisms of desorption, back-diffusion, and slow bleed of TMI act as source terms recontaminating the groundwater again, sometimes even to higher levels than previously encountered.

SUMMARY OF THE INVENTION

It is an object of the present invention to provide a nontoxic chemical permeability in situ enhancement process for accelerating decontamination of subsurface fine-grain sediments.

It is another object of the invention to provide a method for the removal of certain classes of liquid and/or solid phase contaminants from fine-grained sediments, provided these contaminants are miscible or appropriately soluble in at least one of the treatment chemicals. Examples of such contaminant classes for which this treatment is applicable are hydrophilic hydrocarbons, and hydrophobic fuel hydrocarbons and halogenated hydrocarbons. Examples of hydrophilic hydrocarbons are acetone, ketones, methanol and propanol. Examples of fuel hydrocarbons are octane and heptane. Examples of halogenated hydrocarbons are chloroform, carbon tetrachloride and TCE.

Another object of the invention is to provide a process that is usable as part of a hybrid process that remediates heterogeneous contaminated subsurfaces and/or homogeneous subsurface containing contaminants trapped in fine-grained sediments.

The novel aspect of this invention is the application of permeability enhancing chemicals and organic solvents to the subsurface to accelerate the remediation of contaminated fine-grained sediments (FGS). Accelerated remediation of contaminated FGS is achieved by the application of clay hydraulic conductivity enhancement mechanisms, e.g., the collapse of the negative double layer surrounding the water-clay particle interface, by the introduction of either cationic flocculents (CF) or organic solvents (OS).

This invention exploits the same phenomena observed (dramatic increases in the hydraulic conductivity of clayey bodies) with the displacement of indigenous porewater with water containing cationic flocculents, (CF), or with organic solvents, (OS). Previous applications of this phenomenon were in the agricultural use of CF to alter clayey soils, and in the failure of clay-lined waste retention ponds containing OS. Specifically, clays have a very low hydraulic conductivity when they are water saturated. Water is a very polarizable molecule having a large dielectric constant of 78.5. As water surrounds the microscopic clay platelets, they acquire an electrostatic negative double layer that arises at the water/clay interface. The electrostatic repulsive forces surrounding each clay particle repel. The repulsive forces and the tortuous arrangement of these charged platelets effectively blocks the flow of water through such clays. If contaminants were to penetrate clays, they are unable to be flushed out of the clays since the hydraulic conductivity is so low.

DETAILED DESCRIPTION OF THE INVENTION

Figure 1:
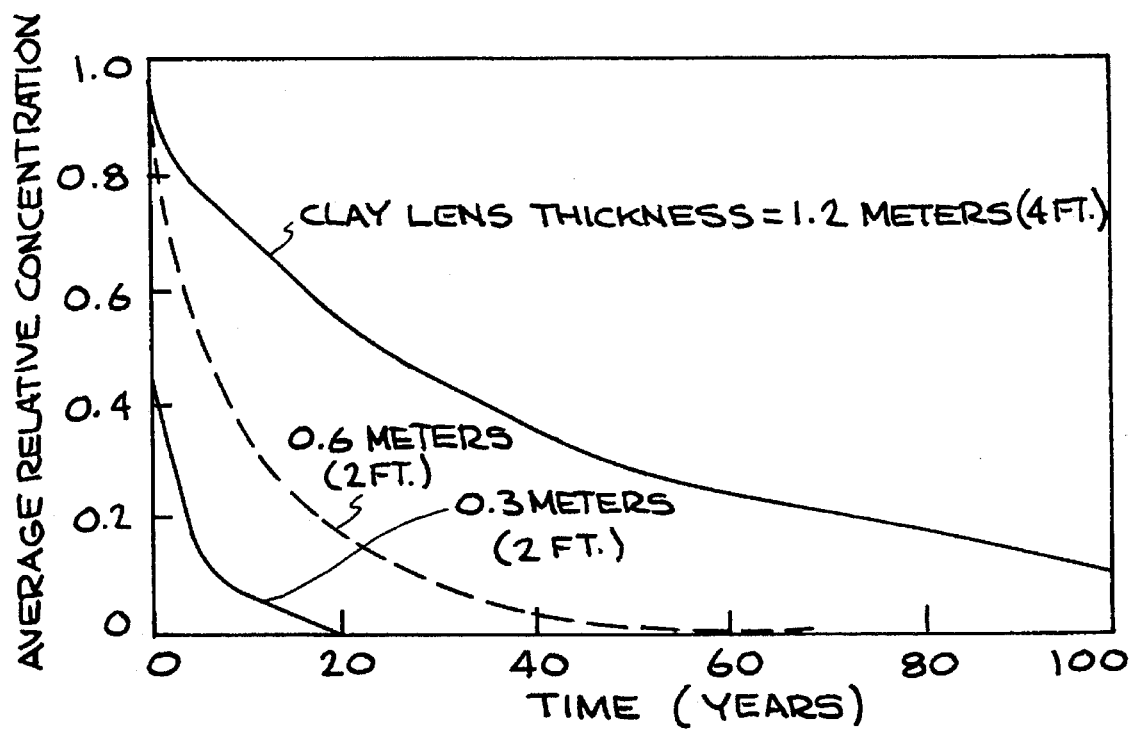
FIG. 1 shows changes in average relative trichloroethene concentration in clay lenses of varying thicknesses as a function of time.
Figure 2:
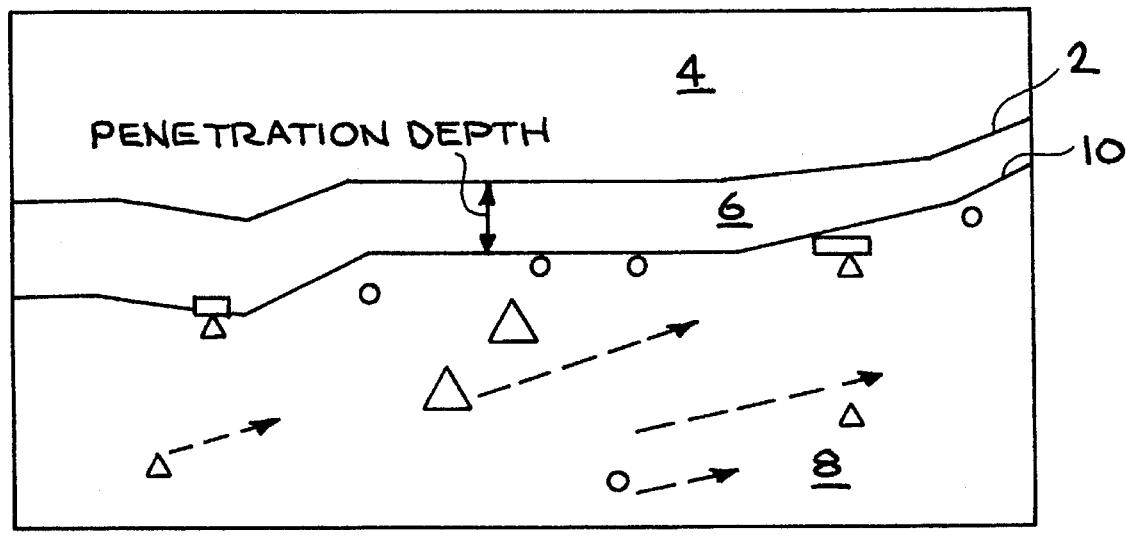
FIG. 2 is a conceptual model of FGS contamination near the CGS and FGS interface.
Figure 3:
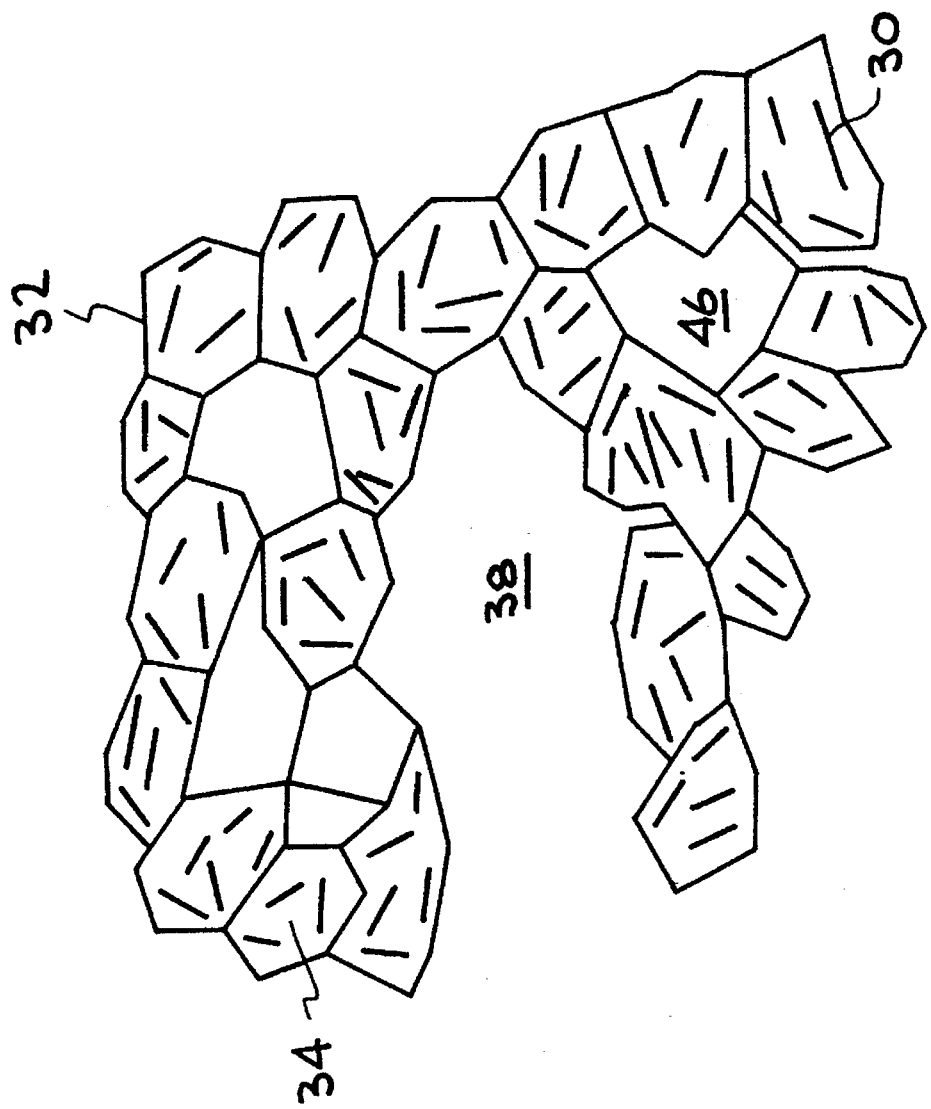
FIG. 3 shows a conceptual model of clay clusters.

FIG. 3 illustrates the currently accepted model describing the clay fabric. Individual clay platelets or particles 30 are represented by randomly oriented line segments. A clay cluster 32, represented by a polygon, is an ensemble of randomly oriented clay platelets that are in the swollen state surrounded by micropore water 34. Because of the high degree of tortuosity within a cluster, the water permeability is quite small. Groups of clusters form a mini-structure in which a mini-pore 46 is filled with a fluid, water or air, that communicates to the individual clusters. Finally, a macroscopic feature such as a crack 38 can serve as a conduit for clay hydration or dehydration.

The packing of lamellar clay crystals is driven by large capillary pressure changes producing clusters that are naturally anisotropic and that swell along a preferred axis normal to the plane of the predominant particle orientation. It is postulated that a network of cracks persists in clays even after they become water saturated and plastic even if they are not subject to large compressive stresses. If the lateral extent of the regions between cracks were greater than the majority of their component particles, cracks must occur at intervals about the average cluster size throughout the clay body. The distance over which an unbroken order persists in a clay matrix is limited by the stresses generated by either the swelling or shrinking of the neighboring cluster. During displacement of the indigenous porewater, particles bounding the coarser mini-pore voids are brought under the influence of short range attractive capillary pressures. Whether a particular flaw becomes a member of a network of cracks depends on factors such as a large stress gradient, the local water potential, inherent strength of the flaws, the presence of colloidal debris, and the orientation of clusters.

Thus once the hydraulic conductivity is viewed from the perspective of the soil fabric being permeated (see FIG. 3), then the multitude of factors that influence this fabric can be understood. The important factors include: water content, density, method of compaction and their relation to layering, break down of clods and uniform dispersion of soil particles, the hydraulic gradient and influence of seepage forces, the anisotropy and flow direction, the physical and chemical properties of the permeant, the thixotropic and other time effects, the degree of saturation that controls the space available for fluid flow, and pore clogging of mini-and macro-pores as a result of the growth of microorganisms.

Referring again to FIG. 3, the clay cluster fabric model can explain the observed increase in hydraulic conductivity of clays. Hydraulic conductivity increasing materials, such as cationic flocculents (CF) or organic solvents (OS), first enter the material through the macro and mini-pore structure. Communication is slowly established within a clay cluster, and the CF or OS displaces the indigenous micropore water and begins to collapse the double negative layers with a subsequent reduction in the clay cluster volume. Since volume is conserved, the volume of the minipores and macropores increase accordingly. The clay fabric losses its plasticity, and the shrinkage of clay cluster volumes produces internal tensile stresses exceeding the tensile strength of the altered clays, producing crack failures.

If a nearly incompressible fluid remains in the mini-and macro-pores, compaction will not occur. However, if such a fluid were to drain, or be replaced by a compressible fluid such as air, compaction may occur, such as in the case of air-dried clays that have lost a sizable amount of water through evaporation.

The invention utilizes the introduction of cationic flocculents (CF) or organic solvents (OS), having a dielectric constant considerably lower than water to alter the structure of the clays by collapsing the negative double layer in clays. These materials, (CF) or (OS), alter the clay fabric producing an altered material that can have a flocculated structure, a cracked structure, or both a cracked and a flocculated structure. Such structural alterations have the net effect of increasing the hydraulic conductivity of clays up to four orders of magnitude. Contaminants still exit the clays by molecular diffusion, but the length scales are reduced by several orders of magnitude. Since the time scale for molecular diffusion is proportional to the square of the length scale, estimated speedups, up to a million-fold reduction in the time for contaminants to diffuse out of FGS may be possible, as compared to unaltered clays. The use of an organic solvent to increase the hydraulic conductivity of clays has the additional benefit that the sorbed contaminants readily partition into organic solvents rather than water, and that either the hydrophilic or the hydrophobic contaminants that have entered the clays are either totally miscible in such solvents, or are highly soluble.

A cationic flocculent should be chosen so it is nontoxic, inexpensive, have a high charge density, yet be small enough to readily fit within the micropore spaces of the clayey fabric. Some examples are aluminum polyhydroxide; $Al(OH)_n$; ferric hydroxide, $Fe(OH)_3$ or gypsum and hydrated calcium sulfate.

The OS that should be considered for this process must possess the following properties: not prohibited by the United States Environmental Protection Agency (EPA) from being introduced into the subsurface, must be relatively inexpensive, must have a viscosity similar to water, must have a relatively high boiling temperature, must be soluble in water, hydrophobic fuel hydrocarbons and halogenated hydrocarbons must be miscible or highly soluble in it, hydrophilic contaminants must be miscible or highly soluble in it, and it must have a dielectric constant considerably lower than that of water. A candidate OS that fulfills these requirements is ethanol, $(C_2H_5OH)$. The process in this invention is not limited to an OS such as ethanol, provided that the replacement OS meets regulatory approval and has most of the desired properties listed above.

Presently, ethanol is an organic solvent that is not prohibited by the United States Environmental Protection Agency (EPA) from being introduced into the subsurface, and possesses most of the desired characteristics of a remediating organic solvent. Ethanol has a dielectric constant near 24, is relatively inexpensive ($1.25/gal.), and most lower molecular weight hydrophobic fuel hydrocarbons and halogenated hydrocarbons are completely miscible in ethanol. In addition, hydrophilic hydrocarbons such as acetone, ketone, methanol, propanol, etc., are miscible or highly soluble in ethanol. For the higher molecular weight hydrocarbons, the solubility of such hydrocarbons in ethanol decreases approximately linearly with increasing molecular weight. In addition, ethanol is completely miscible in water. Ethanol is only effective in increasing the hydraulic conductivity of clays in concentrations above 80%, with the maximum effectiveness at 100%. In concentrations below 12%, bacteria metabolize ethanol in the presence of oxygen to eventually form water and carbon dioxide.

The cycling of slugs of cationic flocculents and organic solvents as ethanol through clays has the advantage that the hydraulic conductivity increases with each cycle since the clay fabric is altered toward increasing hydraulic conductivity. The micropore spaces that surround each clay particle are reduced and the mini-and-macro pore space that surrounds clusters of clay particles increases.

Because fine-grained sediments are mixtures of the primary clays such as kaolinite, illite, and smectite, and additional components of organic material, silt, etc., the crack lengths, widths, and spacings will vary widely from location to location, and even within a given location. These constitutive compositions and crack information must be determined before remediation to optimize the field remediation work.

The field implementation of this invention is valid for both thin clayey lenses as well as for massive FGS bodies that are contaminated. The following procedure is valid for either type of contaminated FGS. However, the massively thick contaminated FGS bodies will require an additional preparatory phase that will be described later. The steps that are required are:

1. Characterization of the subsurface soils and assay of contaminant inventory.

2. Optional, but highly recommended, construction of an in-situ containment vessel containing the soils to be treated.

3. Placement of injection and extraction wells within treatment region.

Figure 4:
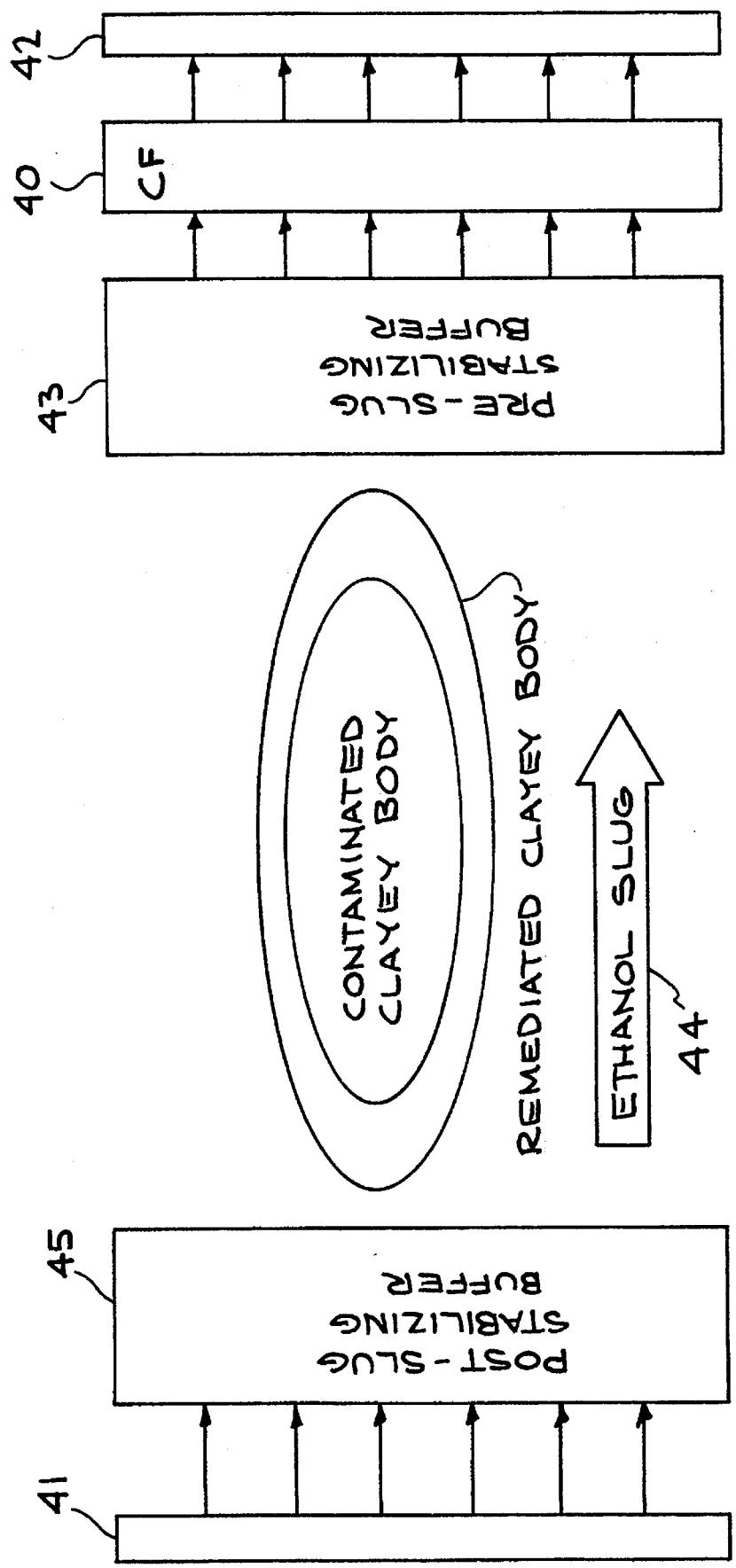
FIG. 4 shows horizontal flooding and remediation of a contaminated saturation zone.
Figure 5:
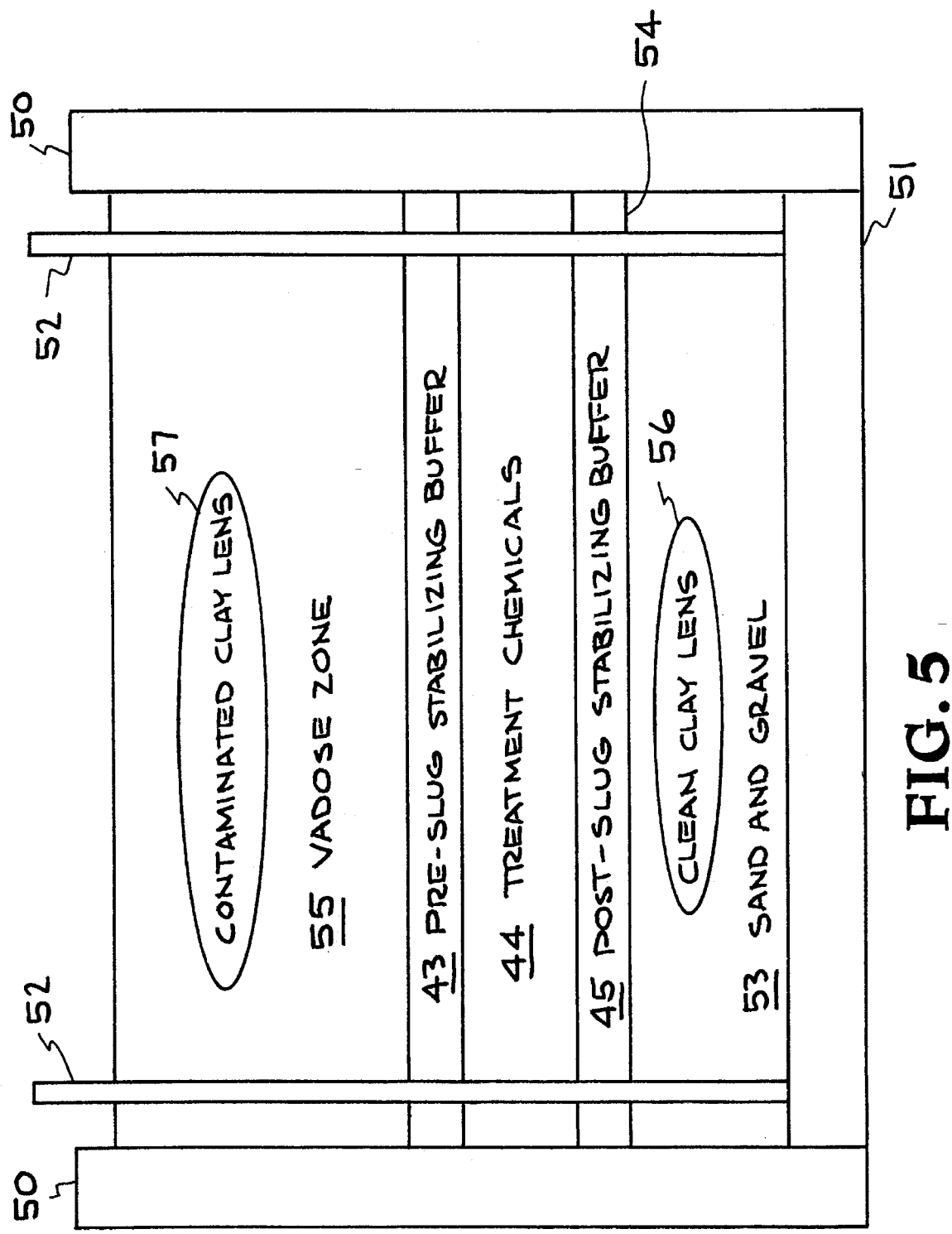
FIG. 5 shows vertical flooding and remediation of a contaminated vadose zone.

4. Cationic flocculents and ethanol will be injected into the treatment region at appropriate wells. This injection will be applicable for both the saturated and unsaturated zones using horizontal and/or vertical flooding. FIG. 4. is an illustration for applying this process to the contaminated FGS in the saturation zone. A pre-determined volume of cationic flocculents 40 is first injected through injection well 41 to precondition the FGS, and is extracted from the subsurface with extraction well 42. Next, a pre-determined volume of pre-slug stabilizing buffer 43 is injected through injection well 41. After the volume of pre-slug stabilizing buffer has been delivered, a pre-determined volume of an ethanol slug 44 is injected through injection well 41, and this ethanol slug 44 is then followed by a pre-determined volume of a post-slug stabilizing buffer 45 that is injected through injection well 41. Extraction well 42 extracts the configuration consisting of: the pre-slug stabilizing buffer 43, the ethanol slug 44 that has altered the contaminated FGS body removing a fraction of the contaminants, and post-slug stabilizing buffer 45. The above process is repeated until the contaminants in the FGS has met or exceeded regulatory remediation requirements. FIG. 5. is an illustration of the vertical flooding to be performed on contaminated FGS in the vadose zone. The figure shows grout walls 50, grout floor 51, perforated wells 52, sand/gravel region 53, water table 54, vadose zone 55, clean clay lens 56 and contaminated clay lens 57.

Figure 6:
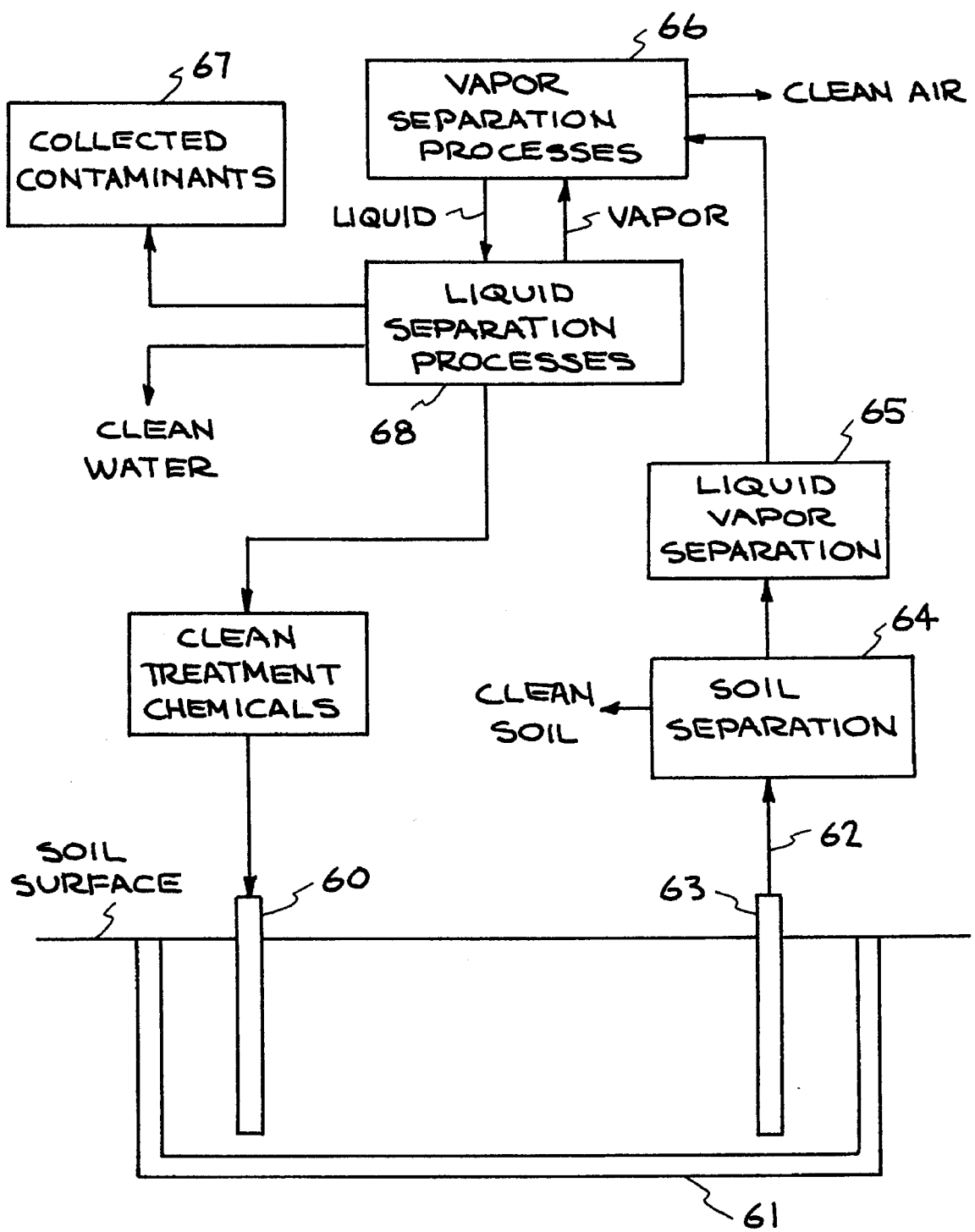
FIG. 6 is an ex-situ effluent separation facility.

5. Extraction wells remove the effluent from the containment vessel. The contaminants may be separated from the water-ethanol mixture, and further separation and recovery of the ethanol will occur. FIG. 6 is an abbreviated illustration of the ex-situ separation facility. It shows the injection of clean ethanol (ETOH) into well 60, located in containment vessel 61. Contaminated effluent 62 exits well 63 and undergoes soil and liquid separation processes. Soil is separated from liquid by process 64. The liquid and vapor are then separated by process 65. Vapor separation process 66 produces collected contaminants 67. Vapor separation process 66 also provides liquid feed for separation process 68, which cycles vapor back to vapor separation process 66, produces collected contaminants 67, clean water and clean ETOH to be reinjected into well 60 to repeat the entire effluent separation process.

6. The ethanol and cationic flocculents will be recycled by reinjecting into the containment vessel until no further contaminants are recovered and the concentrations of contaminants are at or below drinking water standards.

There are three primary reasons for constructing such an in-situ containment vessel:

1. Ethanol readily mobilizes hydrophilic and hydrophobic contaminants that might escape the capture zone of the extraction wells further contaminating a site.

2. Since the unsaturated or vadose zone is most likely to be contaminated, the vadose zone can be treated by this invention using vertical flooding by injecting cationic flocculents and ethanol in one or two wells and extracting the contaminants from other wells that are completed appropriately.

3. To alleviate the possibility of the overburden closing the opened cracks, the containment vessel prevents drainage of the permeability altering fluid from the clay pores in the FGS.

The first stage in the field implementation is characterization of the soil types, and an assay of the chemical contaminants. Attention must be given to the depth of penetration of the contaminants within each contaminated FGS body, the nature of the contaminants, the extent to which the organic matter in the FGS has sorbed contaminants, and the type and concentrations of toxic metal ions adhering to the FGS bodies. This database will be used in determining the remediation process design, especially for the removal of toxic metal ions.

The next step in the field implementation is the construction of an in-situ flow containment vessel. There are several technologies available to construct such a vessel; an effective, economical approach will be described. The vessel can be constructed by using very high pressure water jets to create a cavity in which a temporary or permanent grout is injected. A floor and sidewalls are recommended to enclose a FGS or a heterogeneous section to a depth below the detected contamination zone that may be above or below the water table. Depending upon the size of the containment vessel, one or more injection wells that are completed in the CGS will deliver cationic flocculents and pre-and post stabilizing buffered slugs of ethanol into the subsurface. One or more extraction wells will remove an effluent composed of groundwater, cationic flocculents, organic solvent such as ethanol, and contaminants.

The effluent will be treated at the surface to separate the water, any toxic metal ions, ethanol and hydrocarbon contaminants. The purpose of this separation is to reduce the bulk of contaminated material that will require disposal and to reclaim the organic solvent in appropriately pure form so it can be recycled in the remediation process.

Both the cationic flocculents and ethanol enter the clays by diffusion and displacement of water. As soon as these chemicals have penetrated a certain "skin depth", cracking and/or flocculation will occur. This cracking and/or flocculation accelerates, exposing continuously more surface area to the altering permeating fluids. However, a contaminated massive clay body has a relatively small surface to volume ratio. Hence the alteration of the clayey fabric to increase its hydraulic conductivity may be slow without intervention.

Figure 7:
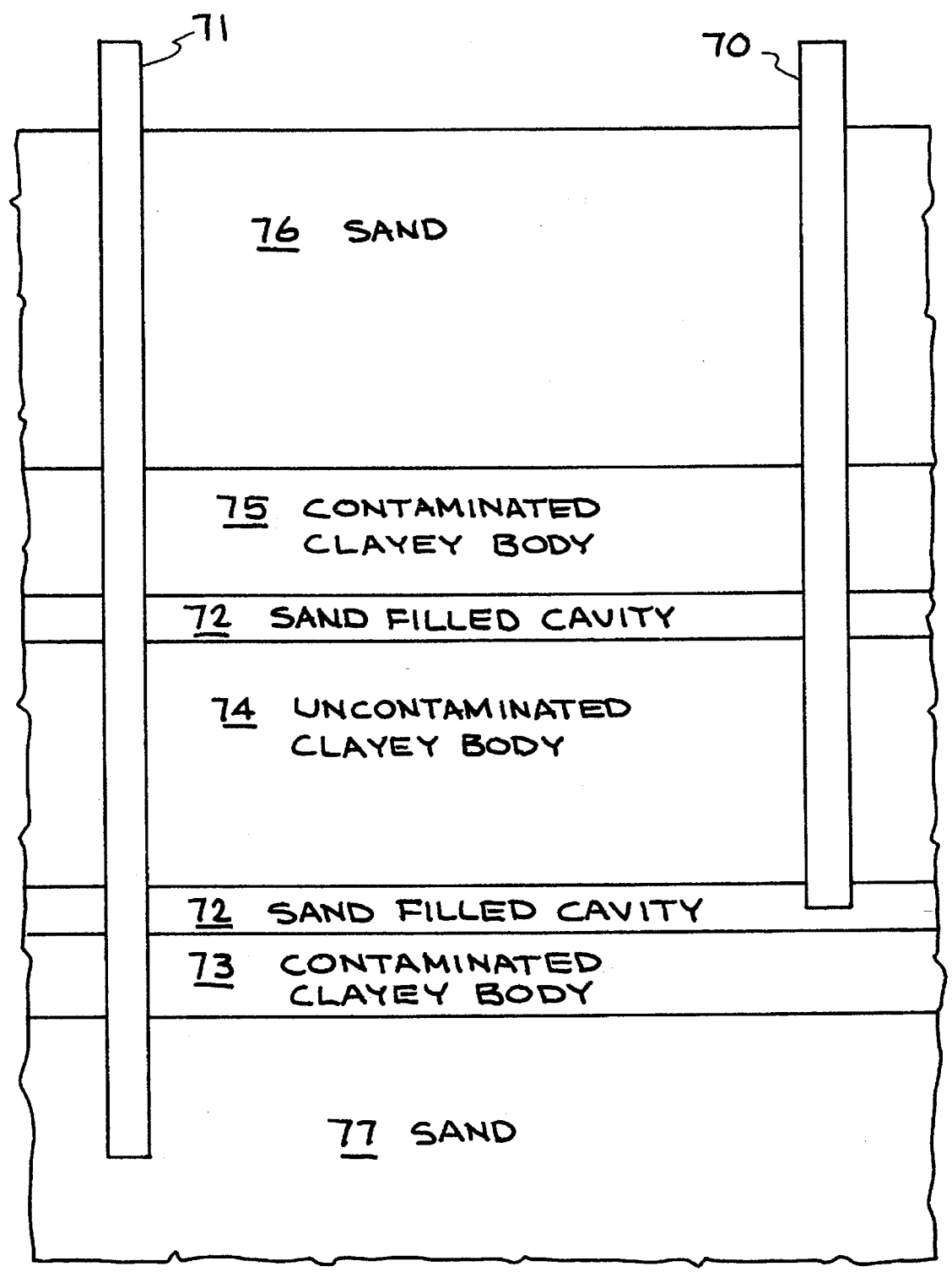
FIG. 7 shows multiple treatment fronts in massive contaminated FGS.

To accomplish the intervention, core samples are obtained at various locations within the massive clay body to determine the depth of penetration of the contaminants. As an example, within the same core holes, hydraulic fracturing is simulated using available high pressure water jets to cut a disk-shaped cavity within the clay, and pack the cavity with sand. The purpose of forming these sand-filled cavities within the clay is to produce multiple fronts to greatly reduce the time to produce a cracked, flocculated structure. FIG. 7. is an illustration of the creation of multiple treatment fronts in contaminated massive FGS bodies using the method described above. The decision to use alternative technologies to enlarge the available surface area for treatment needs to determined on a case by case basis.

Figure 8:
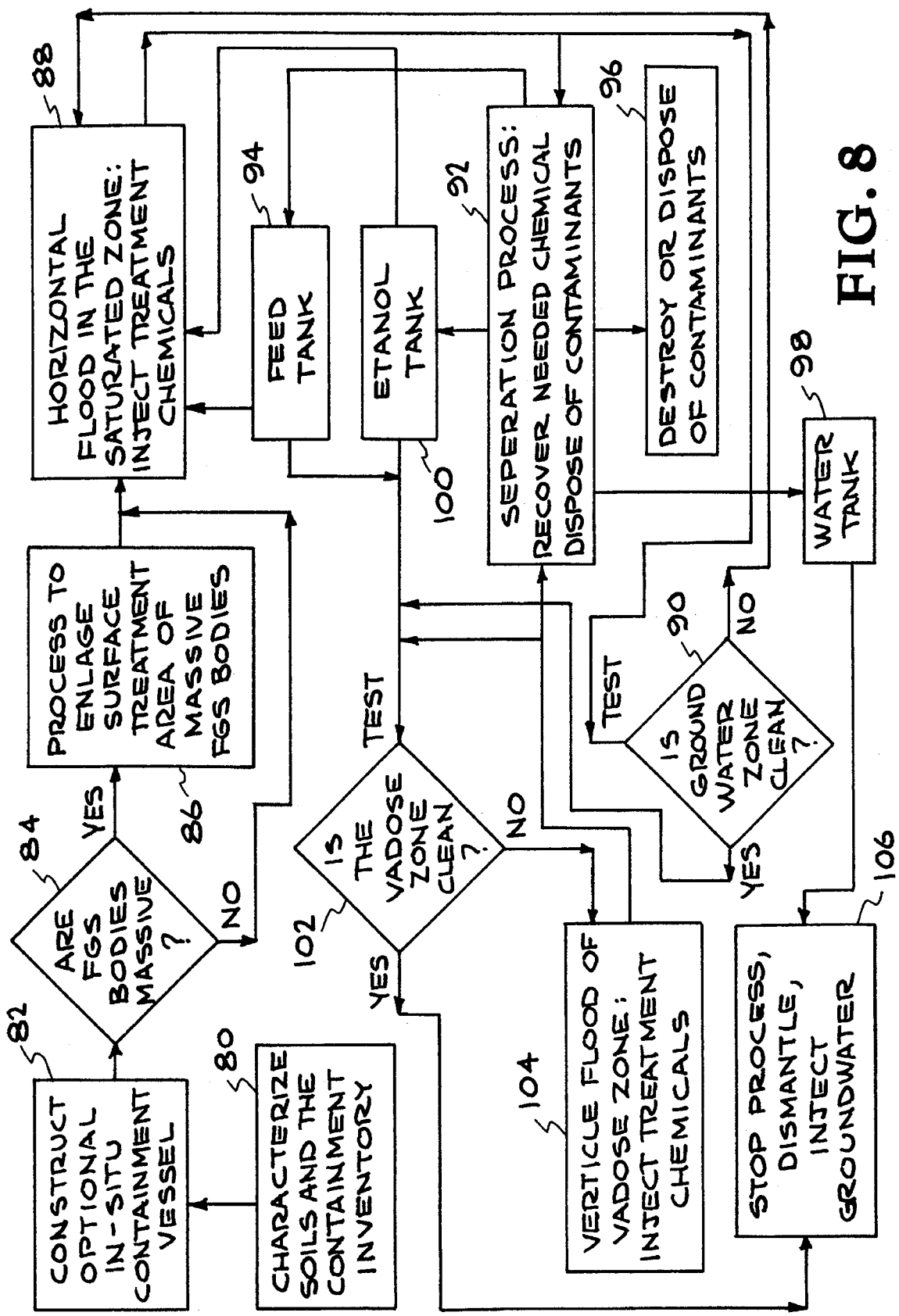
FIG. 8 shows a process flow diagram of the present invention for contaminated fine-grained sediments.

Referring to FIG. 8, Block 80, a detailed site characterization is first performed to (1) determine the composition of the soils at the contaminated site, and (2) to perform chemical analyses of the soils to determine the composition and concentrations of the inventory. If the soils are contaminated and are composed of fine-grained sediments of low hydraulic conductivity, then this invention is applicable.

In constructing an in situ flow containment vessel (Block 82), the side-walls are drilled to a depth below the contamination layer as determined by the site characterization. High pressure water/sand jet drilling is an inexpensive method to create a vertical cavity. This cavity is filled with grout from the depth to the surface. (Alternately, oblique wells may be drilled and injected with grout.) Next, the floor of the in situ containment vessel is also constructed by high-pressure jet drilling by forming a cavity that is also filled with grout to the side walls. The assemblage of the four side walls and floor should be tested for leaks by a combination of lithium bromide (LiBr) and helium tracer tests. The leaks should be sealed, and retested for leaks.

Depending on whether the low hydraulic conductivity sediments are large massive structures in the subsurface, or thin lenses, different actions are taken. If the clay body is massive (Block 84), then there are available several technologies that can precondition the massive clay body to increase the treatment surface area. This is readily accomplished by the following example technologies. Create a series of disk shaped cavities by hydraulic jet drilling, fill them with sand or gravel, and emplace injection wells that are completed at these cavity locations (Block 86). FIG. 7 illustrates this method of creating multiple fronts. It shows injection well 70 and extraction well 71. Sand filled cavities 72 separate contaminated clayey body 73, uncontaminated clayey body 74, contaminated clayey bodies 75 and 75' and sand regions 76 and 77. Other methods of creating multiple fronts include hydraulic fracturing, thermal fracturing and accoustical fracturing.

A set of injection and extraction wells should be located on either side of the contaminated clay bodies; these wells should be completed in the permeable course grained sediments if possible.

If the saturated zone containing ground-water contains contamination, then the saturated zone should be horizontally flooded (FIG. 8, Block 88). Here, the injection and extraction wells are completed below the water table to the depth of the containment vessel floor, and are located in soils with much larger hydraulic conductivity than the contaminated FGS.

If non-aqueous phase liquids (NAPLs) have been detected, inject a dilute (50%) ethanol into the subsurface. The very high solubility NAPLs in ethanol will mobilize these contaminants and permit them to be removed from the subsurface. Continue injecting dilute ethanol until no more NAPLs are detected. Block 90 represents the testing process. Once the NAPLs are removed, remediation of the contaminated fine-grained sediments is begun.

In remediating the fine-grained sediments below the water table, cationic flocculents are first injected and allowed to alter the structure of the contaminated FGS. The coupled injection-extraction process should be undertaken at a very low hydraulic gradient to allow sufficient time for the cationic flocculents to permeate and alter the FGS structure. Then, nearly 100% ethanol is injected into the pretreated FGS; the ethanol is driven very slowly through the clay bodies by the injection-extraction process in order to give ample residence time to form an altered structure within the FGS. The ethanol, as it is altering the interior of the contaminated FGS, also decontaminates the surface. The sorbed contaminants on the organic material in the FGS preferentially move into the ethanol phase. The contaminants that have diffused into the interior of the FGS, now rapidly egress because: the network of cracks has tremendously reduced the diffusion time out of the altered FGS; the contaminants are now in a fluid in which they are miscible or highly soluble; and the ethanol and contaminants can be readily mobilized and extracted to the surface. Hydrocarbon contaminants are separated from the groundwater-cationic flocculent effluent stream at a surface chemical separation facility (Block 92). Next, the hydrocarbons are separated from the groundwater-effluent stream. A separate commonly assigned, copending patent application, Ser. No. 08/495,293, titled "Separation Of Toxic Metal Ions, Hydrophilic Hydrocarbons, Hydrophobic Fuel And Halogenated Hydrocarbons And Recovery Of Ethanol From A Process Stream", fully incorporated herein by reference, presents the details regarding the separation process. From the surface separation facility, cationic flocculents will be separated, decontaminated and held in a separate feed tank (Block 94). The hydrocarbon contaminants will be separated or destroyed (Block 96). The decontaminated ethanol-groundwater mixture will be treated to separate the groundwater (Block 98), leaving behind 100% pure ethanol that will be stored in a feed tank Block 100). The decontaminated groundwater and clay pore water will be held in temporary storage tanks until the conclusion of the remediation process. At the end of the remediation process, the ethanol will be extracted, and the water will be reinjected into the subsurface.

The first pass of the cationic flocculents and ethanol is expected to be inadequate in removing most of the hydrocarbon contaminants from the contaminated clay because of the dilution of the ethanol by the groundwater and the water contained within the pore spaces of the contaminated clays. The philosophy of this invention is to replace as much of the water in the subsurface by ethanol. When the concentration of ethanol in the subsurface approaches 100%, the maximum benefit of clay cracking and flocculation will occur, as well as the miscibility of hydrocarbon contaminants in the ethanol. At this stage, the optimal hydraulic conductivity increases and decontamination rate occurs.

In order to determine when the saturated zone is acceptably remediated to stringent drinking water standards, core samples of treated clays are taken, as well as any water. Chemical analyses will determine whether the concentrations are above standards, if so, the cycling of ethanol through the FGS continues until the hydrocarbon contamination levels are below acceptable standards. If the concentrations are acceptably low, the remediation phase of the saturated zone is complete.

In many instances, the unsaturated zone or vadose zone contains large amounts of contaminants in the FGS bodies. If this is not the case, the remediation is finished. The ethanol will be extracted from the saturated zone, and the groundwater held in storage tank will be injected into the ground. The in situ containment vessel will be rubblized, and surface equipment be removed.

However, if the vadose zone is indeed contaminated (FIG. 8, Block 102), then a vertical flooding process, from the saturated zone up to the surface within the confines of the in situ containment vessel will take place (Block 104). First, water containing cationic flocculents is injected into the containment vessel to vertically flood the contaminated FGS. Next, vertical pre-and post buffered slugs of ethanol are injected into the vadose zone to treat the contaminated vadose zone FGS bodies. The slugs of cationic flocculents and contaminants as well as water-ethanol and contaminants are extracted slowly, and decontaminated by process.

Similar to the process in the saturated zone, cationic flocculents are separated and stored in a tank. The hydrocarbon contaminants are separated from the effluent stream, and are either destroyed or disposed of. The ethanol-water mixture is separated and stored in a water storage tank and into an ethanol storage tank.

The soils in the vadose zone are sampled for chemical analysis. If the soils have contaminant concentrations above the stringent drinking water standards (Block 102), ethanol is reinjected into the vadose zone (Block 104), and cycled through the injection-extraction process until the soil contaminant concentrations are below drinking water standards. If this is the case, then the process is allowed to stop (Block 106).

When the stop decision is reached, the extractable cationic flocculents and ethanol are removed from the subsurface. The stored water is aerated, and seeded with the indigenous biota, and the water is then injected into the containment vessel. Depending upon the decision of the regulators, the in situ containment vessel can be destroyed so the remediated treatment cell is now allowed to communicate with the rest of the subsurface environment. The surface drilling and chemical separation facilities will be dismantled, and the injection and extraction wells will be capped. The remediated fine-grained sediments, after the removal of the cationic flocculents and ethanol, and the injection of decontaminated groundwater will nearly resemble the conditions of the soils before contamination. The remediated FGS; however, may have hydraulic conductivities that are larger than that of the pristine condition state. The main benefit will be that toxic contaminants will have been removed from the environment.

Changes and modifications in he specifically described embodiments can be carried out without departing from the scope of the invention, which is intended o be limited by the scope of the appended claims.

The invention claimed is:

1. A nontoxic chemical permeability in situ enhancement process for accelerating decontamination of subsurface fine-grain sediments (FGS), comprising:
    flooding a contaminated region of the subsurface with a flooding solution comprising nontoxic, water soluble chemicals that increase the hydraulic conductivity of said FGS; and
    extracting to the surface said flooding solution containing mobilized contaminants.

2. The method of claim 1, wherein the flooding step includes flooding a contaminated region of the subsurface with a flooding solution comprising nontoxic, water soluble chemicals that increase the hydraulic conductivity of said FGS by creating an altered material structure selected from a group consisting of a flocculated material structure, a cracked material structure and a cracked and flocculated material structure, wherein said altered material structure increases the accessed sediment surface area, permits easier access to the interior of said FGS by said chemicals, promotes rapid egress of contaminants from said FGS, possesses a high cosolvency-solubility property for the contaminant, increases the affinity of the contaminant sorbed on said FGS for the flooding solution compared to its affinity for the solid sediments, and decreases the partitioning coefficient of the contaminant with respect to solid material and increases it for the flooding solution.

3. The method of claim 2, wherein the flooding step includes flooding of the contaminated region of the subsurface with a flooding solution comprising pre-buffered and post-buffered chemical slugs that comprise safe, nontoxic water soluble chemicals that increase the hydraulic conductivity of said FGS by creating an altered material structure selected from a group consisting of a flocculated material structure, a cracked material structure and a cracked and flocculated material structure.

4. The method of claim 3, further comprising constructing an in situ containment vessel enclosing the treatment region to limit the dispersion and escape of mobilized contaminants to the region external to the treatment region, prevent the dispersion and escape of flooding solution to the region external to the treatment region, and to facilitate treatment of the vadose zone by solvent flooding.

5. The method of claim 4, further comprising replacing the extracted flooding solution at the end of the treatment process with decontaminated, aerated groundwater seeded with indigenous biota.

6. The method of claim 5, further comprising the step of destroying the in situ containment vessel to permit ecological and hydrological communication of the region enclosed within the containment vessel with the region external to it.

7. The method of claim 6, further comprising increasing the treatment surface area of massive contaminated FGS.

8. The method of claim 1, wherein the flooding step includes flooding of a contaminated region of the subsurface with at least one flooding solution comprising nontoxic, water soluble chemicals selected from a group consisting of cationic flocculents and organic solvents that increase the hydraulic conductivity of said FGS by creating an altered material structure selected from a group consisting of a flocculated material structure, a cracked material structure and a cracked and flocculated material structure.

9. The method of claim 8, wherein the flooding step includes flooding of a contaminated region of the subsurface with at least one flooding solution comprising nontoxic, water soluble chemicals selected from a group consisting of cationic flocculents that have a high charge density and organic solvents that increase the hydraulic conductivity of said FGS by creating an altered material structure selected from a group consisting of a flocculated material structure, a cracked material structure and a cracked and flocculated material structure.

10. The method of claim 9, wherein the flooding step includes flooding of a contaminated region of the subsurface with at least one flooding solution comprising nontoxic, water soluble chemicals selected from a group consisting of cationic flocculents that have a high charge density and organic solvents that increase the hydraulic conductivity of said FGS by creating an altered material structure selected from a group consisting of a flocculated material structure, a cracked material structure and a cracked and flocculated material structure, wherein said cationic flocculents are selected from a group consisting of aluminum polyhydroxide ($Al(OH)_n$), ferric hydroxide ($Fe(OH)_3$), and gypsum (hydrated calcium sulfate).

11. The method of claim 9, wherein the flooding step includes flooding of a contaminated region of the subsurface with at least one flooding solution comprising nontoxic, water soluble chemicals selected from a group consisting of cationic flocculents that have a high charge density and organic solvents, comprising ethanol ($C_2H_5OH$), that increase the hydraulic conductivity of said FGS by creating an altered material structure selected from a group consisting of a flocculated material structure, a cracked material structure and a cracked and flocculated material structure.

12. The method of claim 4, wherein the step of constructing an in situ containment vessel enclosing the treatment region includes using very high pressure water jets to create a cavity in which a temporary or permanent grout is injected, wherein a floor and sidewalls are created to enclosed a FGS or a heterogeneous section to a depth below a detected contamination zone.

13. The method of claim 7, further comprising the step of enlarging the surface treatment area of massive FGS bodies by creating multiple fronts using available high pressure water jets for hydraulic fracturing to cut at least one disk-shaped cavity within the clay, wherein the cavity is packed with sand, wherein said multiple fronts reduce the time to produce a cracked, flocculated structure.

14. The method of claim 1, further comprising the step of determining the composition of the soils at the contaminated site, and performing chemical analyses of the soils to determine the composition and concentrations of a contaminant inventory.

15. The method of claim 7, further comprising the step of enlarging the surface treatment area of massive FGS bodies by creating multiple fronts with a fracturing method selected from a group consisting of hydraulic fracturing, thermal fracturing and accoustical fracturing.

16. A nontoxic chemical process for in situ permeability enhancement and accelerated decontamination of fine-grain subsurface sediments, comprising:

horizontally flooding the saturated zone of a contaminated site using a flooding solution comprising non-toxic, EPA approved chemicals, wherein said flooding solution increases the hydraulic conductivity of fine-grain sediments by creating an altered structure that permits the rapid egress of saturated zone contaminants from said fine-grain sediments;

extracting said flooding solution and said saturated zone contaminants to the surface;

vertically flooding-the contaminated vadose zone of said contaminated site with said flooding solution; and extracting said flooding solution used in the vertically flooding step and said vadose zone contaminants to the surface.

17. The method of claim 16, wherein the horizontally flooding step and the vertically flooding step each include creating an altered material structure with said flooding solution, wherein said altered material structure is selected from a group consisting of a flocculated material structure, a cracked material structure and a cracked and flocculated material structure.

18. The method of claim 17, further comprising constructing an in situ containment vessel enclosing a treatment region comprising said saturated zone and said vadose zone to limit the dispersion and escape of mobilized contaminants to a region external to said treatment region, to prevent the dispersion and escape of said flooding solution to said region external to said treatment region, and to facilitate treatment of said vadose zone with said flooding solution.

19. The method of claim 18, further comprising increasing the treatment surface area of massive contaminated FGS.

20. The method of claim 18, wherein the horizontally flooding step and the vertically flooding step each include creating an altered material structure with said flooding solution, wherein said flooding solution comprises cationic flocculents and organic solvents, wherein said cationic flocculents are selected from a group consisting of aluminum polyhydroxide ($Al(CH)_n$), ferric hydroxide($Fe(OH)_3$), and gypsum (hydrated calcium sulfate), and said organic solvents comprise ethanol ($C_2H_5OH$).

* * * * *